Jan. 17, 1950    G. V. GAMALLO    2,494,994
METAL CUTTING MACHINE
Filed Aug. 27, 1946    6 Sheets-Sheet 1

Inventor
*Gumersindo V. Gamallo.*
By W. B. Harpman
Attorney

Jan. 17, 1950

G. V. GAMALLO 2,494,994

METAL CUTTING MACHINE

Filed Aug. 27, 1946

Inventor
Gumersindo V. Gamallo.
By
W. B. Harpman
Attorney

Jan. 17, 1950 G. V. GAMALLO 2,494,994
METAL CUTTING MACHINE
Filed Aug. 27, 1946 6 Sheets-Sheet 4

Inventor
Gumersindo V. Gamallo.
By
W. B. Harpman
Attorney

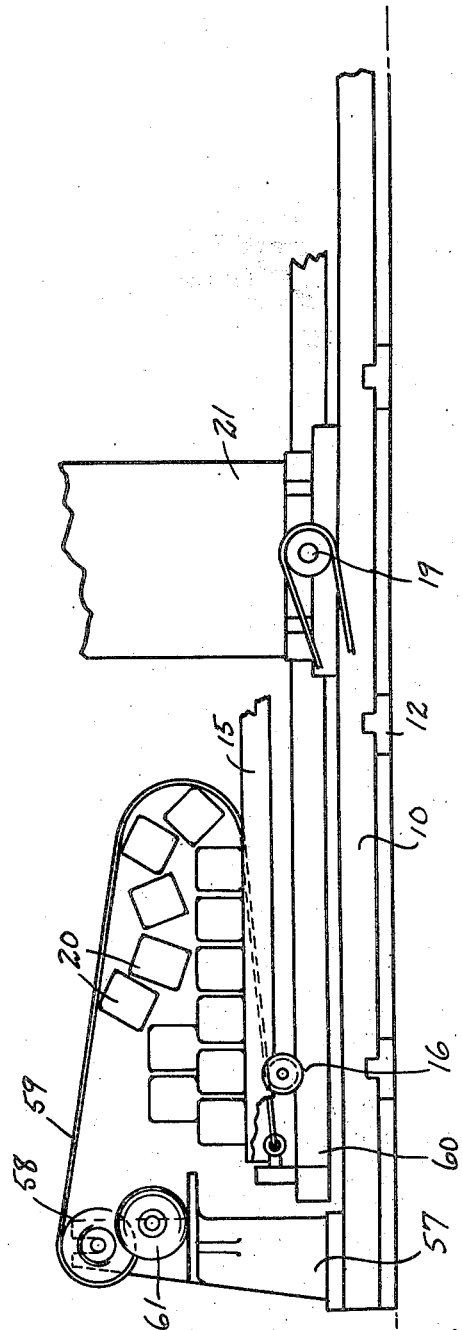

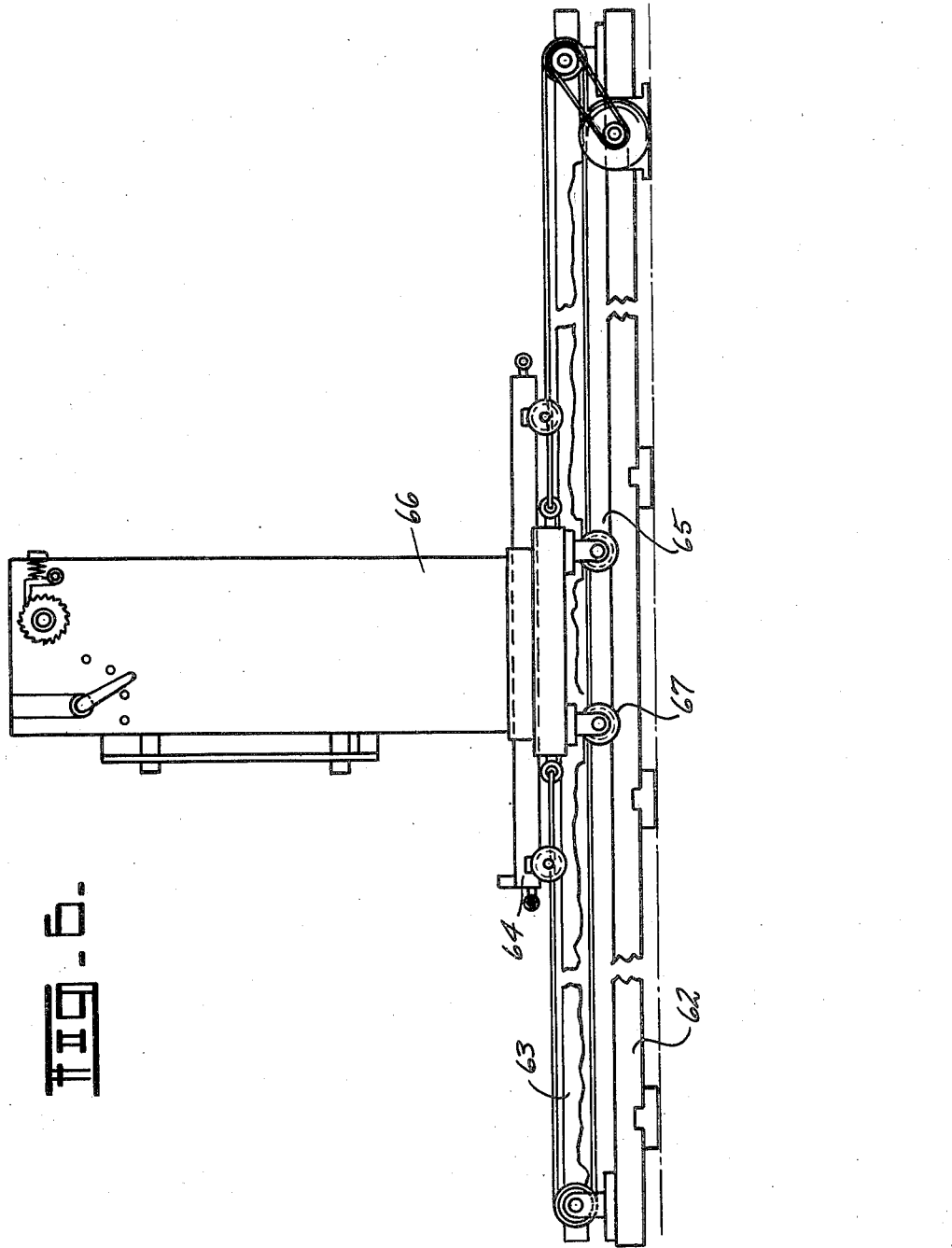

Patented Jan. 17, 1950

2,494,994

UNITED STATES PATENT OFFICE 2,494,994

METAL CUTTING MACHINE

Gumersindo V. Gamallo, Youngstown, Ohio

Application August 27, 1946, Serial No. 693,213

2 Claims. (Cl. 266—23)

This invention relates to a metal cutting machine and more particularly to a device employing a plurality of acetylene torches for cutting various metal articles such as billets, bars, rods, tubes and the like.

The principal object of the invention is the provision of a metal cutting machine particularly adapted for mill installation for cutting various metal articles into predetermined lengths.

A further object of the invention is the provision of a machine for simultaneously controlling and directing a plurality of cutting torches with respect to a plurality of metal articles to be cut.

A still further object of the invention is the provision of a device for synchronizing the action of a plurality of cutting torches with respect to a plurality of metal articles to be cut so that the several cutting torches may be adjusted and positioned in desirable relationship to the said articles to be cut.

A still further object of the invention is the provision of a metal cutting machine and having means for moving a plurality of metal articles to be cut through a cutting area.

A still further object of the invention is the provision of a metal cutting machine having means for collecting cut metal articles from the machine and removing the same therefrom.

A still further object of the invention is the provision of a cutting machine for metal articles particularly adapted for steel mill operation whereby long lengths of steel bars, rods, pipes, etc., may be conveniently cut to predetermined sizes simultaneously and automatically and gathered from the machine after cutting automatically.

The metal cutting machine shown and described herein has been designed to facilitate the cutting of various metal products into predetermined lengths, performing the cutting operation rapidly and simultaneously, thereby enabling a plurality of metal articles to be cut to predetermined lengths with a minium of effort.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is iillustrated in the accompanying drawing, wherein:

Figure 5 is a side view of a portion of the cutting machine with parts broken away.

Figure 6 is a side view of a modified form of the cutting machine.

Figure 1:
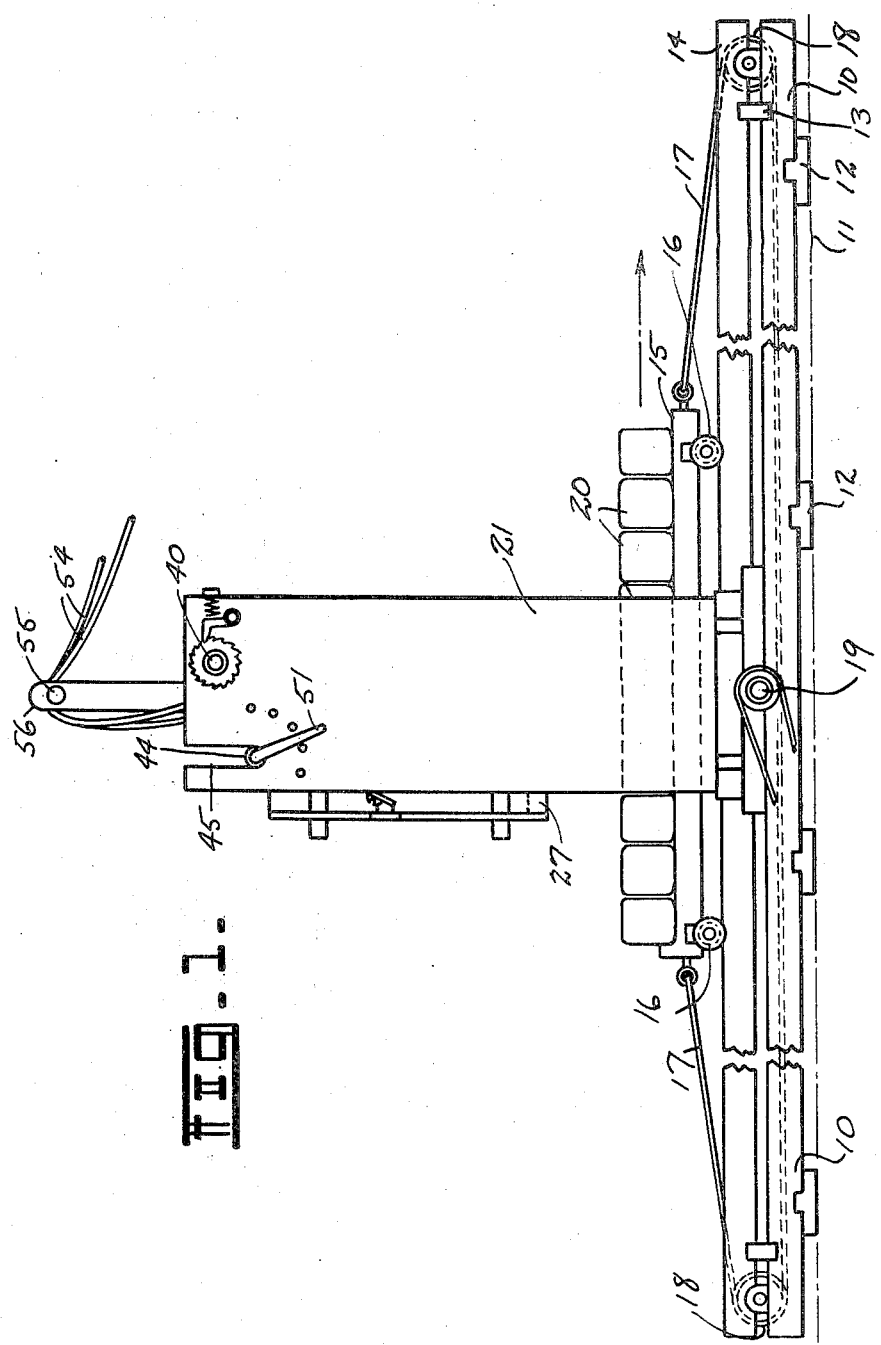
Figure 1 is a side view of the metal cutting machine.

By referring to the drawings and Figures 1, 2, 3 and 4 in particular, it will be seen that a metal cutting machine has been disclosed which comprises a base 10 positioned in elevated relation to a supporting surface 11 by means of supporting members 12. Secondary supporting members 13 position a plurality of track members 14 and the members 10, 12, 13 and 14 form a firm weight distributing base and track assembly upon which a carriage 15 is mounted by means of a plurality of track engaging wheels 16. The carriage 15 is adapted to be moved back and forth on the tracks 14 by means of cable 17 affixed to the opposite ends of the carriage 15. The cables 17 are passed over rollers 18 located in the outermost ends of the track and base assemblies and positioned in the area between the tracks 14 and the base 10.

Figure 2:
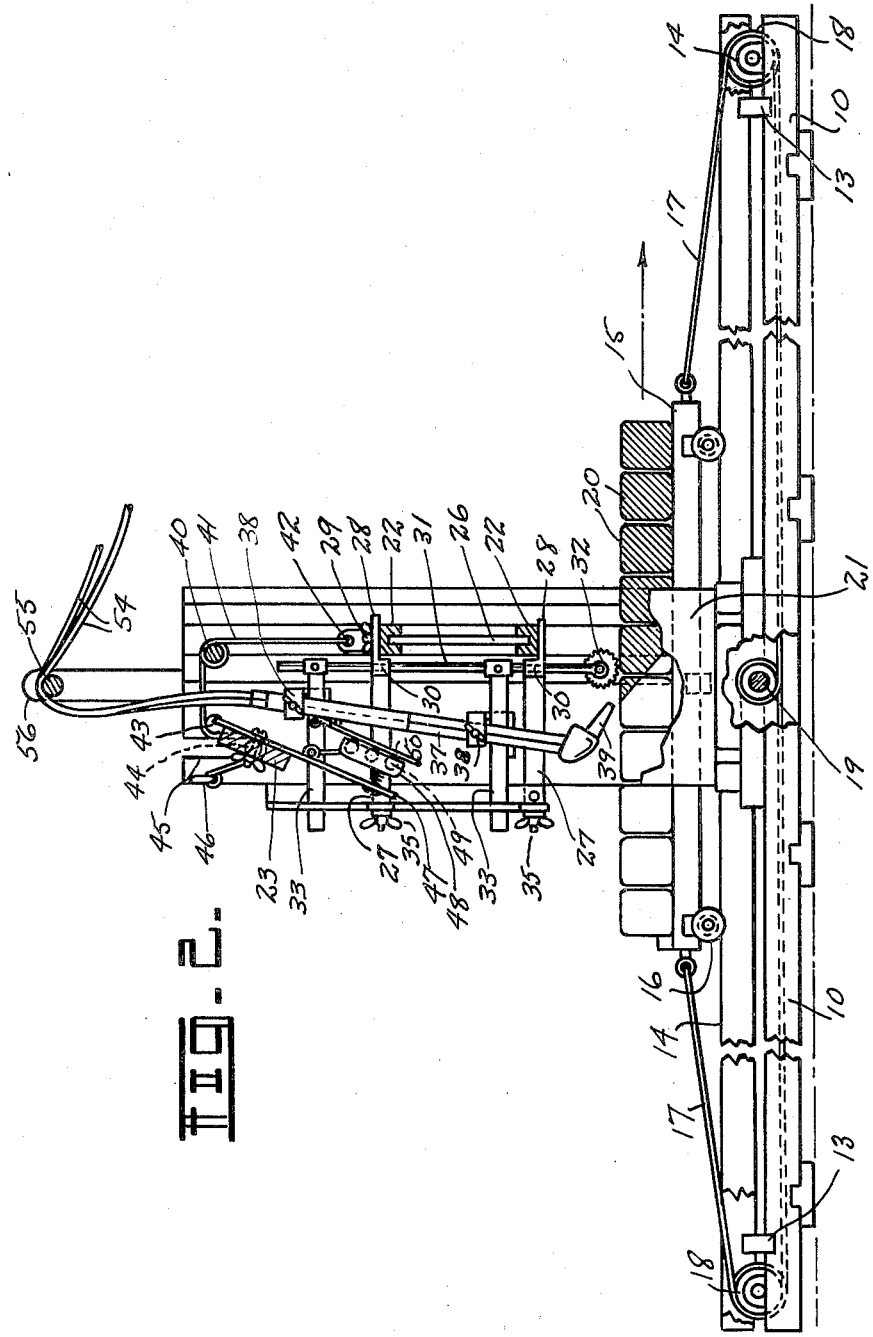
Figure 2 is a side view of the cutting machine with parts broken away and parts in cross section.
Figure 3:
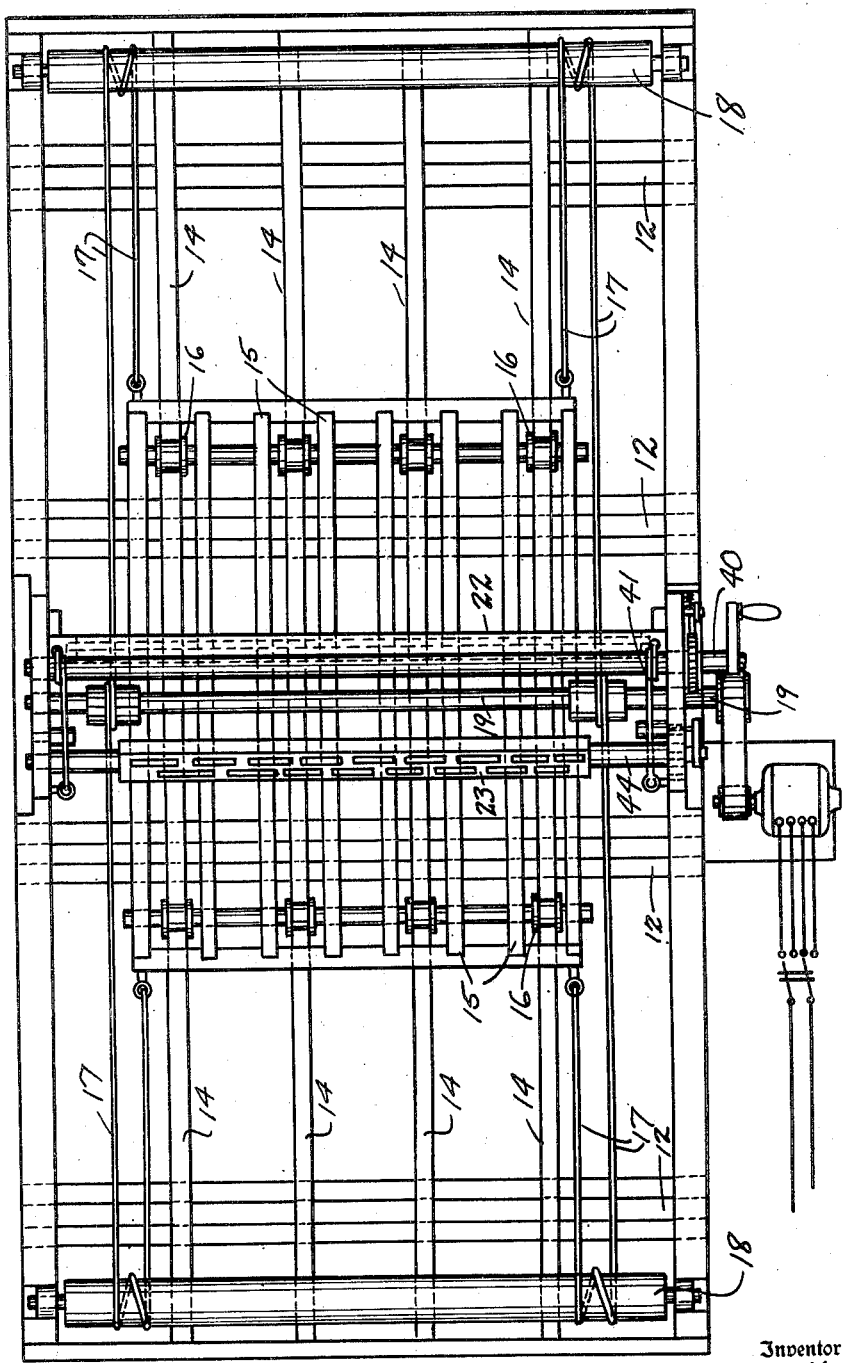
Figure 3 is a top view of the metal cutting machine.

As best shown in Figure 2 of the drawings, the cables 17 are passed around a transversely positioned shaft 19 which is adapted to be motor driven as by a belt or gear reduction drive so that upon rotation of the shaft 19, the cables 17 will be moved thereby imparting movement to the carriage 15 and causing it to roll from left to right or right to left, depending upon the direction of rotation of the shaft 19. The carriage 15 is formed of a plurality of rib members standing on edge, as best shown in Figure 3 of the drawings, so as to present a minimum of structural surface in top plan. The carriage 15 is adapted to support a plurality of metal articles to be cut, such as are indicated in the drawings by the numeral 20. It will thus be seen that the carriage 15 may be moved to one end of the track 14, the metal articles 20 may be positioned thereon and that upon rotation of the shaft 19, the cables 17 will move the carriage 15 as, for example, from left to right as indicated by the arrows in Figures 1 and 2 of the drawings.

Means for positioning and simultaneously operating a plurality of cutting torches is positioned midway of the track and base assembly and comprises a pair of side members 21 positioned on the base 10. The side members 21 serve to position a transverse bridge member 22 and a tilting bar 23.

Figure 4:
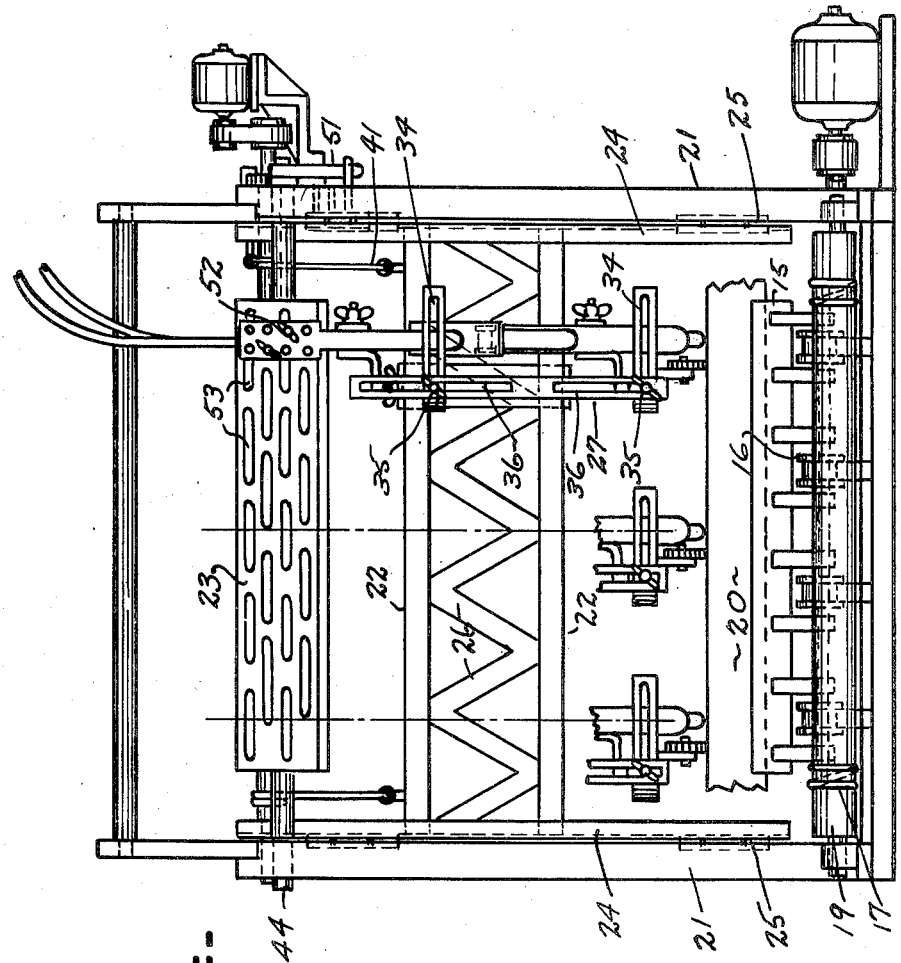
Figure 4 is an end view of the cutting machine.

By referring to Figures 2, 3 and 4 of the drawings, the bridge member 22 and the tilting bar 23 may be seen to be adjustably positioned with respect to the side members 21. The bridge member 22 is positioned for vertical adjustment between the side members 21 by means of inturned, U-shaped flanges 24 which are hinged as at 25 at their bases on a vertical axis to the inner opposed surfaces of the side members 21. The ends of the bridge member 22 are positioned between the U-shaped flanges 24 for vertical movement with respect to the side members 21 and the carriage 15 which is positioned beneath the bridge member 22. The bridge member 22 may be of any desired construction and is illustrated as comprising an open trussed joist, the web members being indicated by the numeral 26. Chord members of the bridge member 22 form the upper and lower surfaces thereof and provide transversely even mounting means for a plurality of cutting torch carrying assemblies, as best shown in Figures 2 and 4 of the drawings.

Each of the cutting torch carrying assemblies consists of a rectangular frame 27 having horizontal extensions 28 formed thereon engaging the upper and lowermost surfaces of the bridge member 22 and positioned thereon by means of adjustable bolt and nut assemblies 29. The frame 27 is provided with bushed openings 30 through which a rod 31 is positioned vertically for movement with respect thereto. A toothed wheel 32 is rotatably positioned on the bottom of the rod 31 and is adapted to engage the uppermost surface of the plurality of metal articles 20 located on the carriage 15. A pair of horizontally positioned arms 33 are affixed to the rod 31 at their innermost ends and their outermost ends are bent at right angles, as shown in Figure 4, and are slotted, as indicated by the numerals 34. Adjustable bolt and nut assemblies 35 adjustably position the arms 33 on a vertical portion of the rectangular frame 27 which is also slotted as indicated by the numeral 36. Positioned on the arms 33 midway between their point of support on the vertical rod 31 and their adjustably positioned outermost ends, which are held by the bolt and nut assemblies 35, there is a cutting torch 37 which is positioned on the arms 33 by means of clamping members 38.

By referring to Figures 2 and 4 of the drawings, it will be seen that by moving the clamping members 38 along the arms 33, the angle of inclination of the cutting torch 37 may be varied to position the head portion 39 thereof at a proper cutting angle. By moving the outer ends of the arms 33 sidewardly with respect to the vertical section of the rectangular frame 27, the cutting head of the torch is turned slightly from side to side. Thus, manual adjustment of the clamps 38 and the adjusting bolt and nut assemblies 35 enables the cutting torch 37 to be properly aligned for efficient cutting of metal articles 20 positioned on the carriage 15 beneath the head or tip portion 39 of the torch 37. It will be seen that the whole torch carrying assembly is capable of vertical travel as controlled by the registry of the toothed wheel 32 on the bottom of the rod 31 which travels over the metal articles 20 to be cut and rises or falls with respect to the elevation thereof. The rising and falling motion is imparted directly to the arms 33 and hence the torch 37 and the assembly rises and falls in accordance with the height of the metal article being cut thereby always maintaining the head or tip 39 of the torch 37 in proper spaced relation to the metal articles 20. As the whole assembly is positioned upon the bridge 22, which in turn is vertically adjustable, it will be seen that various sizes and shapes of articles to be cut can be positioned on the carriage 15 and successfully passed beneath the plurality of cutting torches 37 for simultaneous cutting thereby.

Means for raising or lowering the bridge member 22, and hence the cutting torch assemblies, is provided and is best illustrated in Figures 2, 3 and 4 of the drawings, and it will be seen to comprise a transversely positioned shaft 40 supported at its end sections by bearings located in the side sections 21 and connected by a belt or other drive with a power source such as an electric motor. When the shaft 40 is rotated, a pair of cables 41 wrapped thereabout and connected to the bridge member 22 by means of brackets 42, will be raised or lowered, depending on the direction of rotation of the shaft 40. The other ends of the cables 42 are passed over idler pulleys 43 and beneath the ends of a shaft 44 also positioned transversely of the device and located in slots 45 in the side members 21. The ends of the cables 41 are affixed to eyelets 46 on a horizontal plane with the idler pulleys 43 so that the shaft 44 is raised or lowered by the action of the cables 41 in direct ratio to the movement of the bridge member 22 whenever the shaft 40 is rotated.

The shaft 44 supports the tilting bar 23, heretofore referred to, and the tilting bar 23 is provided for mounting torch controlling means so that valves of the torches 37 may be simultaneously adjusted by tilting movement imparted to the tilting bar 23.

As best illustrated in Figures 2, 3 and 4 of the drawings, the valve adjusting means for each of the torches 37 comprises a tilting arm 47 carrying, in tensioned relation to the lowermost end thereof, a mounting bracket 48 in which a plurality of rollers 49 are positioned, and which rollers 49 directly engage the valve handle 50 of the torch 37. In operation, tilting movement imparted to the tilting bar 23 as by means of a handle 51 (see Figures 1 and 4) causes the tilting arms 47 to move toward or away from the valve handles 50 of the torches 37 and thereby increase or decrease the amount of tension imparted thereto by the mounting brackets 48 carrying the plurality of rollers 49. The valve handles 50 of the torches 37 are thus simultaneously adjusted. Each of the tilting arms 47 are adjustably positioned on the tilting bar 23 by nut and bolt assemblies 52 which are adapted to engage any one of a plurality of slots 53 formed in the tilting bar 23.

It will thus be seen that the metal cutting machine so far described includes means for moving metal articles to be cut beneath an assembly of cutting torches, each of which are adapted for vertical movement with the bridge member 22 supporting them and each of which is capable of individual vertical travel as determined by the engagement of the toothed wheel 32 with the adjacent surface of the metal articles being cut, thereby maintaining proper spaced relation of the tip 39 of the torch 37 with respect thereto.

Means for supplying gases for supporting combustion to the tips 39 of the torches 37 are provided and comprise flexible hoses 54 which are attached to the uppermost ends of the torches 37 and are supported well above the rest of the machine by an elevated, transversely positioned supporting bar 55 carried on upward extensions 56 of the side members 21.

By referring to Figure 5 of the drawings, a detailed end elevation of the metal cutting machine illustrated in Figures 1 and 2 of the drawings may be seen to include an accessory device for moving cut metal articles from the carriage 15 after they have been passed beneath the plurality of cutting torches and cut into predetermined lengths thereby. The means for moving the cut metal articles from the carriage 15 and hence from the cutting machine consist of a pair of widely spaced supports 57 mounting a transverse shaft 58 to which the ends of a plurality of cables 59 are detachably affixed.

During the cutting operation the cables 59 are stretched horizontally beneath the carriage 15 on a horizontal plane with a plurality of eyelets 60 so that the cables 59 do not interfere with the movement of the carriage 15. When the carriage 15 has moved into position adjacent the widely spaced supports 57, the ends of the cables 59 are detached from a series of eyelets, not shown, located in oppositely disposed relation to the eyelets 60 and on a horizontal plane therewith, and passed back over the cut metal articles 20 and attached to the shaft 58. A motor 61 is provided for rotating the shaft 58 thereby winding up the cables 59 and causing the sling-like action of the cables 59, with respect to the plurality of cut metal articles 20, to pull the same to the left in Figure 5 of the drawings and off of the carriage 15 and away from the metal cutting machine itself.

Modifications of the invention herein disclosed will be obvious to those skilled in the art, and one such modification is illustrated in Figure 6 of the drawings wherein a metal cutting machine is shown and is similar in all respects to that heretofore described with the exception that the bridge and the side supporting members therefor are movably positioned with respect to the base and the carriage thereon, thereby enabling either the carriage to be moved or the bridge itself to be moved with respect to the articles to be cut.

In Figure 6 of the drawings the base of the metal cutting machine is indicated by the numeral 62 and a plurality of tracks thereon are indicated by the numeral 63 and a carriage located thereon is indicated by the numeral 64. Secondary tracks 65 are formed on the base 62 for supporting movable side sections 66 which are supported on the secondary tracks 65 by means of wheels 67. The movable side sections 66 correspond in all details with the side sections 21 heretofore referred to, and carry complete cutting torch assemblies adjustably positioned with respect thereto, also in accordance with the disclosure heretofore made. In this form of the invention, both the bridge carried by the side sections 22 and its assembly of cutting torches may be moved with respect to the base 62 of the machine as well as the carriage 64 thereon.

A further modification apparent to those skilled in the art would be the elimination of the carriage 64 and the positioning of metal articles to be cut directly on the base 62 and the moving of the movable side sections 62, the bridge member and the cutting torch assemblies over the metal articles to be cut.

It will thus be seen that a metal cutting machine has been disclosed which is capable of receiving a plurality of metal articles of relatively long lengths and cutting them into various predetermined sections simultaneously and rapidly and automatically. It will also be seen that the machine includes a plurality of cutting torch assemblies, such as acetylene torches, and is so devised that each of the torches employed is movably positioned with respect to the metal articles to be cut passing therebeneath and, further, that the plurality of cutting torches may be simultaneously moved and adjusted by manipulation of the various portions of the metal cutting machine.

Having thus described my invention, what I claim is:

1. In a metal cutting machine having means for moving metal to be cut; a bridge member spanning said metal moving means and frame members adjustably positioned on the said bridge member, a cutting torch on each of said frame members and control means on each of said cutting torches, and movable means carried by each of the said frame members for engaging the surface of the metal to be cut and imparting said movement to said frame members to maintain a predetermined spaced relationship between the said torches and the said metal to be cut, and means for simultaneously manipulating the control means on each of the said cutting torches.

2. In a metal cutting machine having a base section and movable means mounted on said base section for carrying metal to be cut, and an elevated portion spanning the said base section; said elevated portion including a bridge member and a plurality of adjustably, movably positioned frame members affixed to said bridge member, individually controlled cutting torches positioned one on each of said frame members and completely carried thereby, means engaging the said metal to be cut and attached to the said frame members for maintaining the said torches in spaced relation to the said metal to be cut, and a secondary bridge having depending arms engaging the said cutting torches for simultaneously manipulating the same.

GUMERSINDO V. GAMALLO.

REFERENCES CITED

The following references are of record in the file of this patent:

UNITED STATES PATENTS

| Number | Name | Date |
| --- | --- | --- |
| 550,594 | Coleman | Dec. 3, 1895 |
| 1,078,947 | O'Hara | Nov. 18, 1913 |
| 1,701,661 | Bucknam | Feb. 12, 1929 |
| 2,186,096 | Bucknam | Jan. 9, 1940 |
| 2,327,110 | Jones | Aug. 17, 1943 |
| 2,345,412 | Moore | Mar. 28, 1944 |
| 2,363,036 | Anderson | Nov. 21, 1944 |
| 2,404,019 | Yoch | July 16, 1946 |
| 2,441,474 | Deitrich | May 11, 1948 |